United States Patent
Wyss et al.

(10) Patent No.: US 6,683,285 B2
(45) Date of Patent: Jan. 27, 2004

(54) HOT-AIR DEVICE

(75) Inventors: Markus Wyss, Schwarzenberg (CH);
Bruno von Wyl, Kaeglswil (CH)

(73) Assignee: Leister Process Technologies, Sarnen (CH)

( * ) Notice: Subject to any disclaimer, the term of this patent is extended or adjusted under 35 U.S.C. 154(b) by 0 days.

(21) Appl. No.: 10/057,013

(22) Filed: Jan. 24, 2002

(65) Prior Publication Data

US 2002/0108944 A1 Aug. 15, 2002

(30) Foreign Application Priority Data

Jan. 24, 2001 (EP) .............................. 01101490
Dec. 19, 2001 (EP) .............................. 01130185

(51) Int. Cl.$^7$ .............................. H05B 3/06; H05B 3/02
(52) U.S. Cl. ........................ 219/536; 219/375
(58) Field of Search .............................. 219/494, 532, 219/536, 550, 523, 85.13, 546, 548; 126/409; 204/408; 392/488, 385, 407, 383, 384, 379; 338/296, 302, 303, 304, 305, 321

(56) References Cited

U.S. PATENT DOCUMENTS

| | | | | |
|---|---|---|---|---|
| 3,622,750 A | * | 11/1971 | Watts, Jr. .................... 392/407 |
| 3,668,370 A | * | 6/1972 | Pattison .................... 392/385 |
| 3,674,985 A | * | 7/1972 | Regault .................... 219/523 |
| 3,716,693 A | | 2/1973 | Bleckmann | |
| 3,916,153 A | * | 10/1975 | Jay et al. .................... 219/550 |
| 4,002,884 A | * | 1/1977 | Weiss .................... 219/552 |
| 4,097,723 A | * | 6/1978 | Leitner et al. ............... 219/494 |
| 4,339,320 A | * | 7/1982 | Friese et al. ............... 204/408 |
| 4,350,872 A | * | 9/1982 | Meywald et al. ........... 219/375 |
| 4,510,377 A | * | 4/1985 | Merritt et al. .............. 219/550 |
| 4,621,182 A | * | 11/1986 | Driggers .................. 219/85.13 |
| 4,636,617 A | * | 1/1987 | Petersen et al. ............ 338/303 |
| 4,667,086 A | * | 5/1987 | Keefe .................... 219/532 |
| 5,221,916 A | * | 6/1993 | McQueen .................... 338/24 |
| 5,303,325 A | * | 4/1994 | Pasternak et al. ........... 392/379 |
| 5,394,862 A | * | 3/1995 | Firatli et al. ................ 126/409 |
| 5,889,460 A | * | 3/1999 | Bachmann et al. ........... 338/28 |
| 5,973,296 A | * | 10/1999 | Juliano et al. ............... 219/424 |
| 6,392,208 B1 | * | 5/2002 | Arx ............................ 219/544 |
| 6,456,785 B1 | * | 9/2002 | Evans ........................ 392/488 |
| 2003/0010772 A1 | * | 1/2003 | Hantz ........................ 219/494 |

FOREIGN PATENT DOCUMENTS

CH 537 687 12/1971
EP 198 39 044 3/2000

OTHER PUBLICATIONS

Patent Abstracts of Japan Publication No. 01243387, entitled Electric Heater, Hisashi Seki, published Sep. 28, 1989.
Patent Abstracts of Japan Publication No. 04296484, entitled Temperature Control Unit of Heater, By Igarashi Toichi, published Oct. 20, 1992..

* cited by examiner

*Primary Examiner*—Sang Y. Paik
*Assistant Examiner*—Leonid Fastovsky
(74) *Attorney, Agent, or Firm*—Bachman & LaPointe, P.C.

(57) ABSTRACT

Hot-air device with a heating element situated in a stream of air, with a carrier consisting of temperature-resistant material and heating wires located in the air channels, and with at least one metal mount for the carrier, wherein the temperature-resistant material of the carrier comes into at least partial electrical contact with the metal mount, and is connected to a device for interrupting the heating circuit, which, during heating, interrupts the heating circuit when a threshold value is reached owing to the measuring current discharged over the insulating material and the contact element. The direct and very quick measuring principle enables a simple and inexpensive protection of the heating element, as well as control and regulation without additional sensors. It is possible to control or regulate the hot-air temperature of the hot-air device via the measuring current.

7 Claims, 5 Drawing Sheets

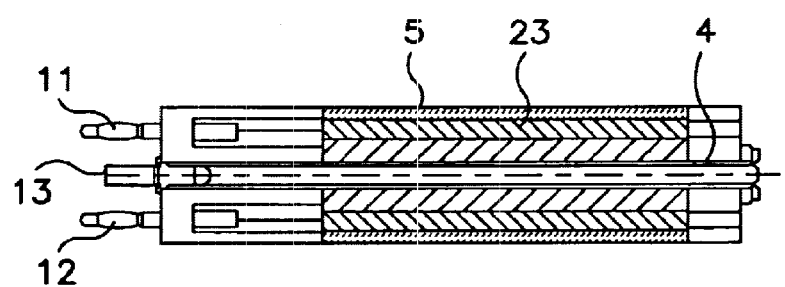
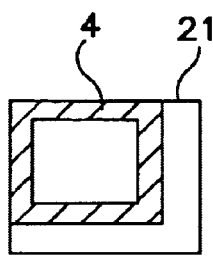
FIG. 5c
FIG. 5a
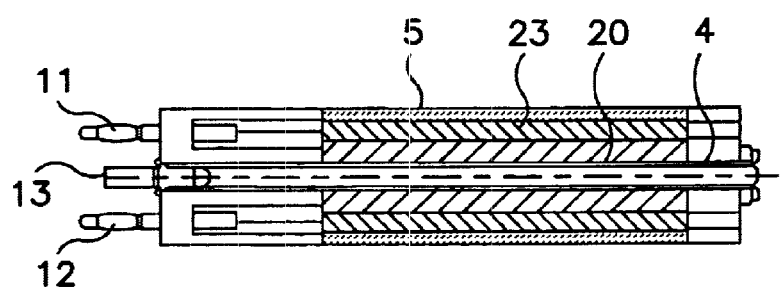
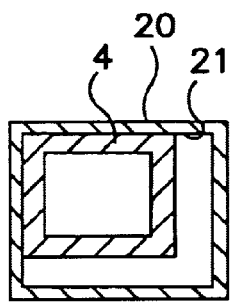
FIG. 5d
FIG. 5b

HOT-AIR DEVICE

BACKGROUND OF THE INVENTION

The invention relates to hot-air devices with a heating element situated in a stream of air, with a carrier consisting of temperature-resistant, insulating material, which exhibits heating wires located in the air channels, and with at least one metal mount for the carrier to fix the carrier into the heating element.

Such hot-air devices are commercially available and known as hot-air appliances, modules or systems. The carrier situated in the air or gas stream usually consists of ceramics or another suitable material, and is accommodated in a heating tube, at whose one end air or gas is blown in. These hot-air devices have various modes for supplying air or gas streams. There are devices in which a fan is housed directly in the casing, and devices with external air stream generators. Various nozzles an typically be connected at the other end of the heating tube. The heating tube accommodates the heating element with the carrier made of temperature-resistant material, usually ceramic material, e.g., which is held by a central pin on a connection head arranged on the side facing the fan. This connection head is also used to electrically hook up the heating wires located in the carrier. Generally located on the side facing the nozzle there is an additional as well as a thin ceramic disk, which also essentially exhibits air channels, wherein this protective disk is not heated by the heating wires. The protective disk is moveable and separated from the carrier, but does also sit on the pin, whose free end is pinched, for example, to prevent the carrier and protective disk from sliding off.

DE 198 39 044 A1 discloses such a device, in which the heating wires are spirally arranged in air channels. In other known devices, the heating wires run in axially parallel air channels.

However, one problem is encountered in cases where the heating element is operated even though the air stream has dropped below minimal levels, e.g., due to fan failure or narrowing of the air inflow or outflow (nozzles). The heating element is here usually destroyed as a result. For this reason, the commercially available hot-air devices exhibit an additional sensor, e.g., thermocouples, optical sensors, resistance meters, etc., to prevent this undesired overheating.

CH 537 687 discloses a device on an electrical resistance heater to limit the heating element temperature to a specific value, in which the tubular heater encompasses a resistance wire that is embedded in a compacted, powdery insulating material. A metal tubular jacket envelops the insulating material with the wire, and the ends of the tubular jacket are tightly sealed by insulating plugs. When a certain maximal temperature is exceeded, the leakage current between the resistance wire and the tubular jacket due to the negative resistance characteristic of the powdery magnesium oxide is used to interrupt the heating circuit.

The object of this invention is to propose an improved hot-air device that achieves an effective heating element protection without additional sensors, e.g., thermocouples, optical sensors, resistance meters, etc., and additionally expands temperature control capability.

According to the invention, the carrier establishes partial, preferably complete, electrical contact with the metal mount. This mount is connected with an electrical circuit in order to control and/or regulate the heating circuit by means of a current that depends on the heating of the carrier and flows over the temperature-resistant, insulating material between the spiral heating wire situated in the air channels and the metal mount. The electrical circuit can disconnect the heating circuit when a specific measured variable is exceeded and/or reduce power. The measured variable can either be the leakage current flowing over the insulating ceramic material due to heating, or the insulation resistance determined by impressing a current onto a ceramic material. Also known from the CH publication is that the current flowing through the temperature-resistant material given a rising temperature can be acquired and used to control temperature. The heating wire is there embedded in the insulating material, so that a direct contact is established between the heating wire and insulating material. Surprisingly, it was found that this principle also leads to reproducible measuring results in existing hot-air devices, in which the heating wires are arranged in an air stream, i.e., not embedded in the material, so that the heating circuit can be controlled and/or regulated. The carrier is here either contacted on the outer periphery or by means of one or more longitudinal boreholes. To this end, it is important that a sufficient and good contact be achieved between the metal mount and the carrier material. The contact surface can here be the entire surface, or only a portion of the contactable surface in varying temperature zones of the carrier. This depends on which maximal current intensity is required and desired for further signal processing—temperature control/regulation. The lower the contact resistance between the heating wires and contactable surface, the higher levels to which the current can build up. The contact resistance of the heating wires on the ceramic carrier, the internal resistance of the carrier and the contact resistance of the carrier on the contact element are relevant for determining this current. At higher temperatures, the air in the respective air channel becomes ionized. This enables an addition current to flow between the heating wire and carrier, which influences the entire current through the ceramic material. This current through the ceramic insulation material determined by the temperature-dependent insulation resistance and applied voltage between the heating wire and metal mount, will be defined as the measuring current below.

In a preferred design, the measuring current is derived via an already present mount, in particular the central mount. For example, this can be done by using a hollow tube as the mount, preferably polygonal tube, which is expanded from inside after placement of the carrier for purposes of adjusting to the ever-present tolerances of the temperature-resistant material and sufficiently contacting the latter. Expansion from inside can here take place mechanically, pneumatically or hydraulically. Another possibility would be to use round or cornered spring sleeves, which are placed on a metal rod, and hence realize a sufficient contact between the mount and the temperature-resistant material. The mount in the form of a metal pin or hollow tube can also be established through casting with a contacting material, e.g., liquid ceramic, in the gap between the periphery of the central mount and the channel in the carrier.

If not absolutely necessary for contacting the central mount with the carrier, either a hollow pin or a massive pin can be used. In a preferred embodiment, a hollow pin is used, and the temperature sensor is routed through the latter to the tip of the carrier. This makes it easy and inexpensive to additionally incorporate the required temperature acquisition process to regulate the heating wires at the point where the air exits the carrier. The jacket of the temperature sensor advantageously contacts the carrier or hollow tube, and derives the measuring current via the latter.

In a particularly preferred design, the carrier as contact surface exhibits at least one electrically conductive surface.

To this end, the carrier is coated with a conductive material, e.g., silver, or another material that withstands the temperatures encountered for hot-air devices. The coated surface can here be arranged on the outer periphery or inside a borehole, into which a contact element (tube or temperature sensor) is introduced and, as already explained above, dimensioned and situated on the carrier in such a way that the measuring current is no longer acquired point by point, and hence is subject to strong fluctuations, but rather the integral is acquired and derived over all currents impacting the conductive surface.

In an advantageous embodiment of the invention, the electrical circuit controls and/or regulates the heating circuit as a function of the measured insulation resistance of the temperature-resistant insulating material. To measure the insulation resistance, the heating wire is separated from the power supply, and a measuring current is impacted via the metal mount and heating wire connection. The insulation resistance measured as a result is subsequently used for regulating and/or controlling the heating circuit. To be able to perform measurements during operation, it is necessary to this end that the electrical circuit interrupt the heating circuit at the time of measurement, and then activate it again later.

BRIEF DESCRIPTION OF THE DRAWINGS

The invention will be explained in greater detail below based on embodiments in conjunction with the accompanying drawings. Shown on:

FIGS. 5a through 5d shown one way to contact the carrier, with a section through the carrier, and a magnified top view of the free end of the carrier, wherein only the essential parts on which contacting takes place are shown, however;

DETAILED DESCRIPTION OF THE DRAWINGS

Figure 1:
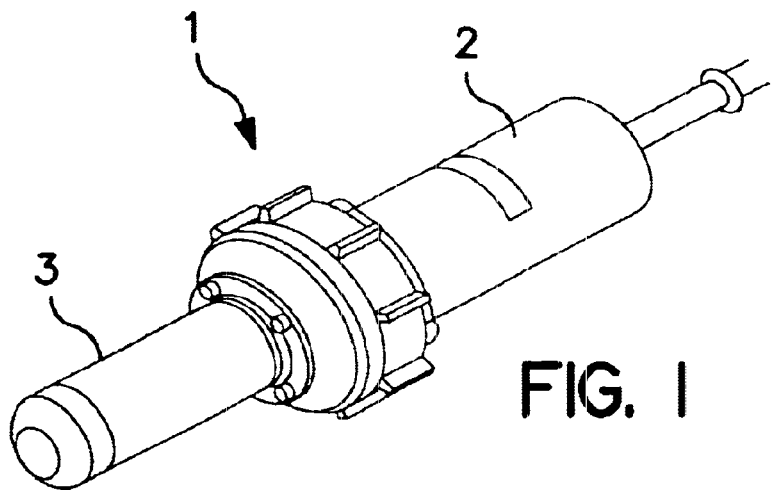
FIG. 1 is a hot-air device.

FIG. 1 shows a hot-air device 1 with a casing 2 for holding a fan and regulating elements. The depicted hot-air device involves a version in which a fan is situated in the casing 2. In other known embodiments, the air stream is generated externally, so that a second hose for supplying the air stream empties into the casings. The invention is independent of the type of air stream generation. The heating tube 3 is hooked up to the casing 2.

Figure 2:
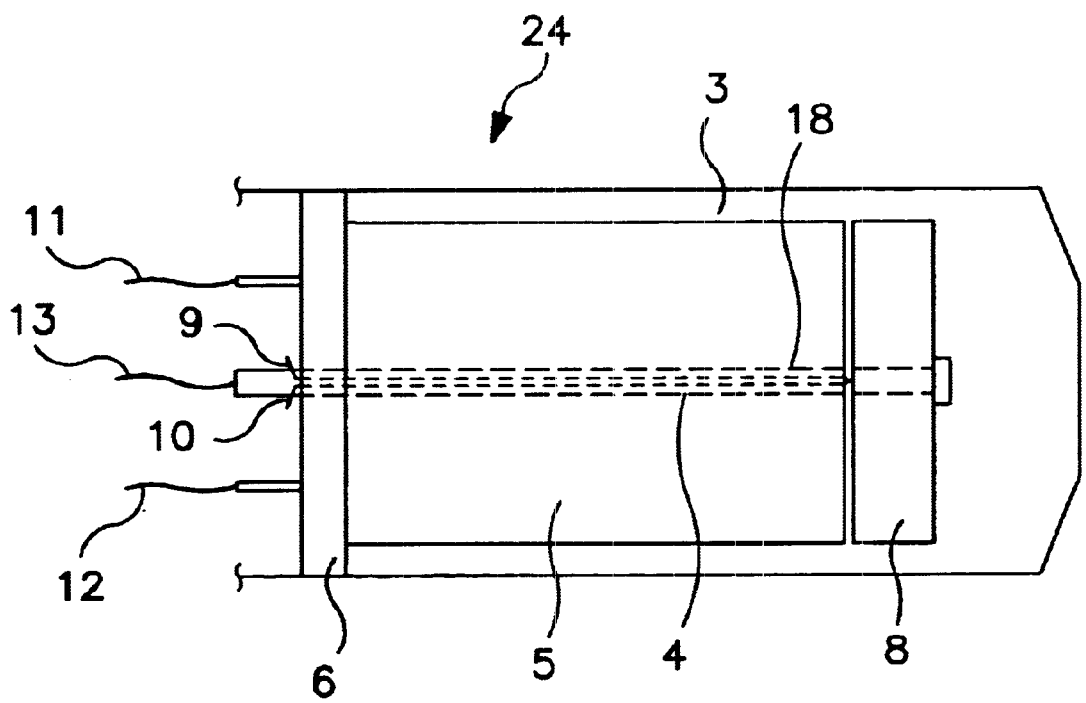
FIG. 2 is a diagrammatic sectional view through the heating tube/heating element of the hot-air device according to FIG. 1.
Figure 3A:
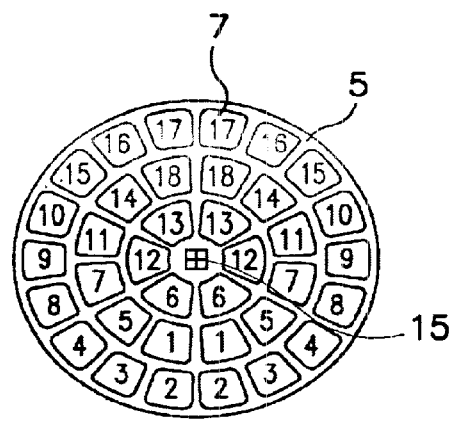
FIGS. 3a and 3b are a front view (3a) of the carrier of the heating element in the heating tube, along with a perspective view (3b) of a carrier with a different design.

FIG. 2 shows a magnified diagrammatic view of a heating element 24 including the heating tube 3, in which a ceramic carrier 5 is fixed over a disk-shaped mount 6 by means of a pin-shaped metal mount 4. The ceramic carrier 5 is provided with air channels 7, running parallel (See FIG. 3a), into which heating wires are laid in a known manner. FIG. 3 shows an example of the connection patterns. The heating wires themselves are not shown.

With reference to FIG. 2, the ceramic carrier 5 is between a protective disk 8 and the mount 6 and is fixed on the disk-shaped mount by means of the metal mount 4. In the embodiment on FIG. 2, the metal mount 4 is designed as & hollow pin, so that a temperature sensor, e.g., a thermocouple, with temperature sensor wires 9 and 10 can additionally be accommodated inside of it. The disk-shaped mount 6 has electrical terminals 11 and 12 for the heating conductors in the air channels 7 of the ceramic carrier 5. The pin-shaped metal mount 4 is also provided with a terminal 13 in order to route the measured current (i.e. leakage current, insulating resistance) flowing over the ceramic carrier 5 to a device 14 (FIG. 4) to separate the heating circuit 17 given an impermissible heating (i.e. the flow of current to the spiral heating wire).

Figure 3B:
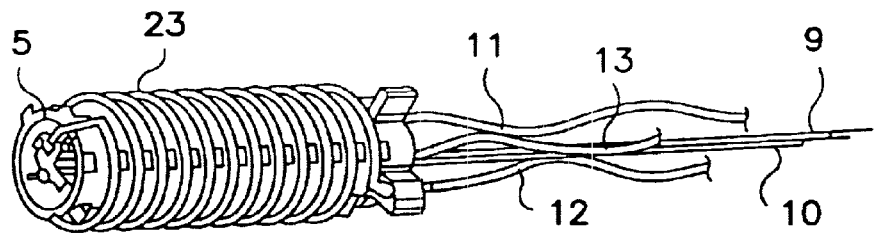

FIG. 3a shows the air channels 7 in the ceramic carrier 5 as well as an in this case rectangular central longitudinal borehole 15 for holding a pin-shaped metal mount 4. To achieve an accurate measured current, it is important that the metal mount 4 is in as good a contact with the ceramic carrier 5 as possible to minimize the contact resistance. FIG. 3b shows a carrier 5 designed as a hollow body with a radially wound heating wire 23.

Figure 4:
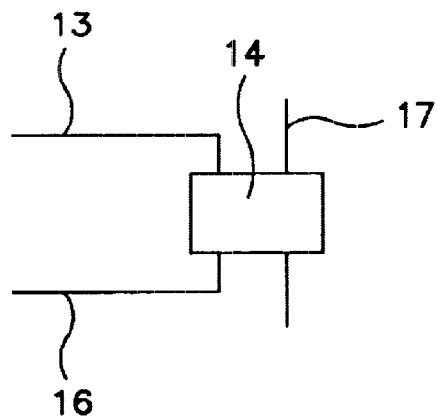
FIG. 4 is the basic connection o the device for interrupting the heating circuit.

FIG. 4 illustrates the basic connection of an electrical circuit 14 for the interruption of the heating circuit 17. The schematic block diagram symbolizes the various possible aforementioned electrical circuit configurations. Depending on the application, for example, the electrical circuit 14 includes a mechanical or electronic switch for separating the heating circuit 17. In addition, the electrical circuit 14 can contain a circuit for measuring and evaluating the insulation resistance. Further, the electrical circuit 14 can accommodate a circuit for regulating the temperature of the beating element as a function of the leakage current or the insulation resistance. 13 denotes the line to the metal mount 4, while denotes a reference potential.

In the one embodiment, circuit 14 exhibits a relay connected between the metal mount 4 (via line 13) and PEN conductor 16. When the limits of the measuring current are reached, the relay is used to separate the heating circuit 17. only after the hot-air device power supply has been completely deactivated can a renewed heating process be initiated.

FIGS. 5a through 5d show a carrier 5 with a central borehole 21, in which the metal mount 4 is designed as a rectangular tube. In this embodiment, the rectangular tube contacts the carrier 5 point by point in the central borehole 21. See FIG. 5c. The heating wire 23 is supplied with power via terminals 11 and 12, and the measured current is discharged via terminal 13. FIG. 5b shows a similar arrangement as on FIG. 5a, but the interior wall of the central borehole 21 is coated with an conductive layer 20, e.g., silver. See FIG. 5d. As a result, the entire arising measuring current is discharged at the points where the rectangular tube [4] contacts the conductive surface 20, while only the current tapped point by point at the respective contact points is discharged in the variant on FIG. 5a.

Figure 6C:
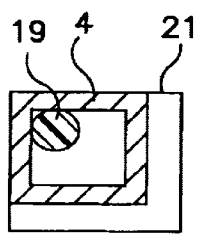
FIGS. 6a through 6d are another embodiment.
Figure 6A:
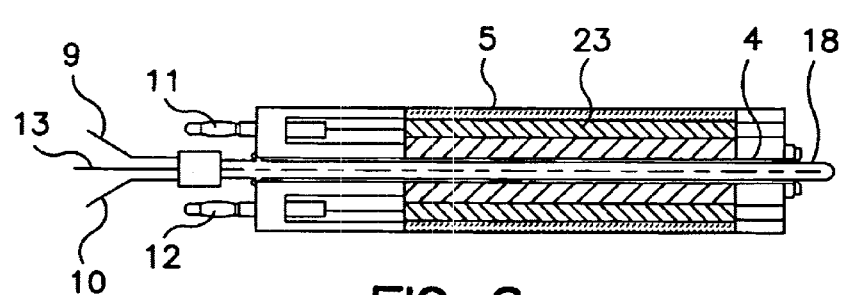
Figure 6D:
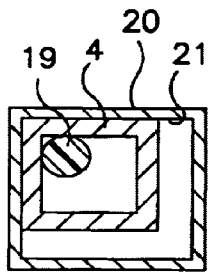
Figure 6B:
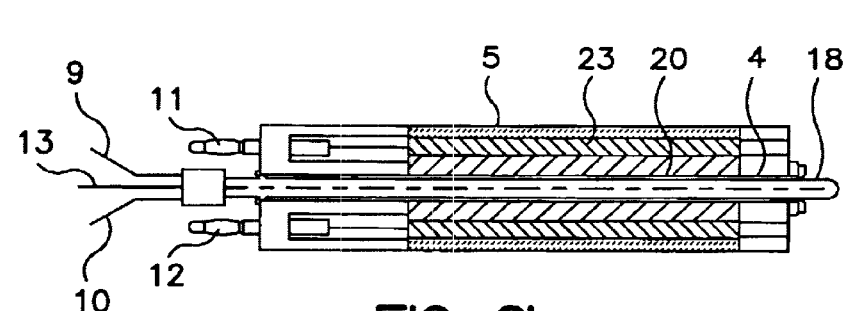

In the variant according to FIG. 6a, a rectangular tube is arranged in the central borehole 21 as the metal mount 4, much as like on FIG. 5a. In addition, the rectangular tube 4 accommodates a temperature sensor 18, whose jacket 19 contacts the rectangular tube 4. See FIG. 6c. In this case, the measured current is discharged via the line 13, while the temperature sensor wires 9, 10 are used for temperature detection. Appropriately, the interior wall of the central borehole 21 is again provided with a conductive surface 20 on FIG. 6b, so that not just point-by-point currents are acquired. See FIG. 6d also.

Figures 7A, 7C:
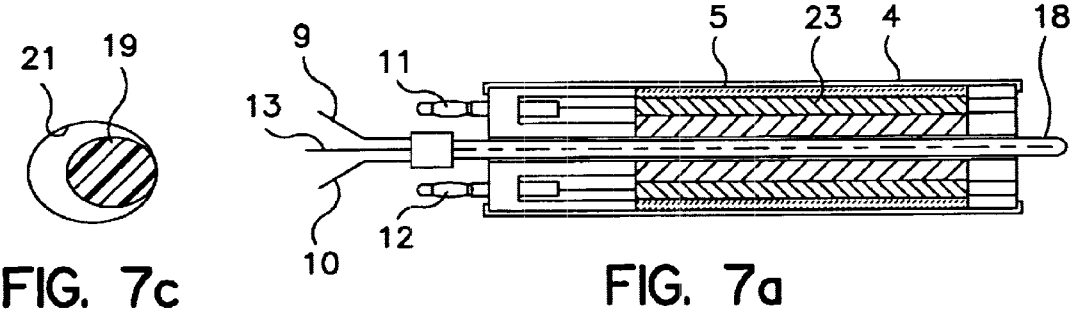
FIGS. 7a through 7d are yet another embodiment.
Figures 7B, 7D:
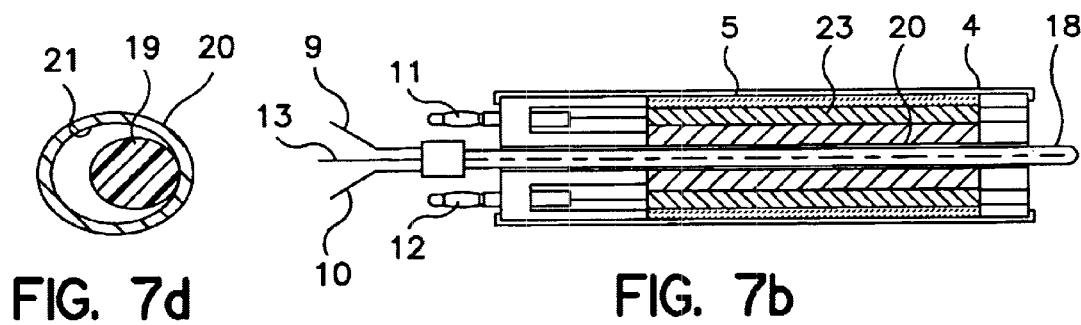

FIG. 7a shows an exterior heating element metal mount 4' positioned on the periphery of the carrier 5. Situated inside a central borehole 21 is the temperature sensor 18, which contacts the wall of the latter. FIG. 7b shows a similar design, but of an additional coating 20 of the central borehole 21, which is contacted by the jacket 19 of the temperature sensor 18. The connections are established as shown on FIGS. 6a and 6b. See also FIGS. 7c and 7d.

What is claimed is:

1. A hot-air device comprises a heating element comprising a carrier of temperature-resistant, insulating material having a plurality of channels, a spiral heating wire located in said plurality of channels, the carrier is sandwiched between a disk-shaped mount and a protective disk, a metal mount in contact with the carrier the disk-shaped mount and the protective disk for fixing the disk-shaped mount and the protective disk to the carrier, the metal mount includes an electrical circuit to provide a measured current, and this electrical circuit includes means for measuring the measured current for controlling current flowing to the spiral heating wire.

2. A hot-air device according to claim 1, wherein the metal mount is a hollow tube housing a temperature sensor, wherein the temperature sensor is in electrical contact with the metal mount.

3. A hot-air device according to claim 1, wherein the metal mount is situated in a longitudinal borehole in the carrier.

4. A hot-air device according to claim 1, wherein a longitudinal borehole in the carrier incorporates a temperature sensor which comes into at least partial contact with the carrier, and the metal mount comprises a hollow cylindrical member arranged on the outer periphery of the carrier.

5. A hot-air device according to claim 1, wherein the carrier exhibits at least one electrically conductive surface as a contact surface between the carrier and metal mount.

6. A hot-air device according to claim 1, wherein the electrical circuit controls the heating circuit by measuring leakage current over the carrier.

7. A hot-air device according to claim 1, wherein the electrical circuit controls the heating circuit by measuring insulation resistance of the carrier.

* * * * *